United States Patent
Hall et al.

[11] Patent Number: 5,957,408
[45] Date of Patent: Sep. 28, 1999

[54] SATELLITE WITH EAST AND WEST BATTERY RADIATORS

[75] Inventors: John C. Hall, Saratoga; Walter S. Gelon, Redwood City, both of Calif.

[73] Assignee: Space Systems/Loral, Inc., Palo Alto, Calif.

[21] Appl. No.: 08/985,452

[22] Filed: Dec. 5, 1997

[51] Int. Cl.$^6$ ............................. B64G 1/44; F28D 15/00
[52] U.S. Cl. ...................... 244/158 R; 244/173; 429/50; 165/42
[58] Field of Search ............................. 244/163, 158 R, 244/173; 429/52, 50, 120; 165/42, 43

[56] References Cited

U.S. PATENT DOCUMENTS

| | | | |
|---|---|---|---|
| 4,880,050 | 11/1989 | Nakamura et al. | 165/41 |
| 5,310,141 | 5/1994 | Homer et al. | 244/158 R |
| 5,372,183 | 12/1994 | Strickberger | 244/158 R |
| 5,395,706 | 3/1995 | Hall | 429/50 |
| 5,634,612 | 6/1997 | Faisant | 244/158 R |
| 5,652,073 | 7/1997 | Lenhart et al. | 429/210 |
| 5,806,803 | 9/1998 | Watts | 244/163 |

OTHER PUBLICATIONS

Handboo of Applied Thermal Design, E.C. Guyer, Editor in Chief, McGraw–Hill Book Company, "Heat Pipes", pp. 7–50 through 7–58, 1989.

*Primary Examiner*—Charles T. Jordan
*Assistant Examiner*—Christopher K. Montgomery
*Attorney, Agent, or Firm*—Perman & Green, LLP

[57] ABSTRACT

A battery system for an body stabilized satellite traveling in a geosynchronous orbit comprises east and second battery modules and similarly facing radiators for discharging beat to deep space. Heat conduction arteries connect each battery module to its associated radiator. An east thermal switch is operable for thermally connecting the first battery module to and from the east facing radiator. Similarly, a west thermal switch is operable for thermally connecting the second battery module to and from the west facing radiator. A computer selectively operates the east and west thermal switches such that, in one instance, for a time between the satellite's emergence from the earth's shadow and its position nearest the sun, the respective thermal switches thermally connect the first battery module to its radiator while thermally disconnecting the second battery module from its radiator. In another instance, beginning when the satellite is nearest the sun and ending as it enters the earth's shadow, the east thermal switch thermally disconnects the first battery module from its radiator while the west thermal switch thermally connects the second battery module to its radiator. In still another instance, beginning when the satellite is in the shadow of the earth, the battery modules are simultaneously thermally connected to their associated radiators. Charging of each battery proceeds while it is thermally connected to its respective radiator.

12 Claims, 4 Drawing Sheets

SATELLITE WITH EAST AND WEST BATTERY RADIATORS

BACKGROUND OF THE INVENTION

1. Field of the Invention

The present invention relates generally to batteries for spacecraft applications and, more particularly, to the relocation of the battery radiators to the generally unused east and west surfaces of a body stabilized satellite. Although the term geosynchronous satellite is used throughout the disclosure, it will be understood that the invention is applicable to any orbiting satellite which maintains opposing faces normal to the sun line throughout the orbit.

2. Description of the Prior Art

The payload capacity of a commercial geosynchronous satellite may be limited by the ability of the satellite to reject waste heat. Heat rejection in space is accomplished by thermal radiation which in turn is most efficiently carried out when the radiation surface is not directly exposed to the sun. For body stabilized satellites with continuously operating payloads only the north and south facing surfaces generally meet this requirement. The other surfaces of the satellite body (east west, earth, anti earth) are all exposed, on an intermittent basis, to direct sunlight. These surfaces then heat up due to the solar flux impingement, and thus cannot be used as efficiently to dissipate heat from equipment which operates continuously due to absorbed solar radiation. The net result is a restriction in spacecraft/payload capability thermal dissipation.

This restriction is partially addressed, at present, by locating some equipment which can operate at very high temperatures on the east and west faces of the satellite. An example of such equipment is the output multiplexer (OMUX) for a communication satellite. As the OMUX is a non-electronic component, it is capable of operating at temperatures above 100° C. and may thus still usefully dissipate heat even when its mounting surface is subject to direct solar illumination. The OMUX, however, does not normally require the total area of the east and west satellite faces. It is the purpose of this invention to enable the relocation of other equipment from the north/south to the east/west faces of the satellite. This relocation, in turn, will free up added north south radiator area for electronic equipment which must operate continuously and thus increase satellite capability.

The spacecraft battery represents a candidate piece satellite equipment to relocate to the east and west faces of the satellite. An obvious feature of the battery is that it produces its maximum heat when discharged; and discharge in turn usually occurs when the satellite is shadowed by the earth and there is no incident solar radiation on the east and wet surfaces (highest thermal satellite radiation capability). The battery is recharged during periods of solar illumination when alternately the east and west surfaces of the satellite are exposed to the sun. Heat rejection from the battery is required during recharge to cool the battery which has heated during the high rate discharge and reject heat generated during the inefficient periods of recharge which occur as the battery reaches a full state of charge. However, recharge need not be continuous and, in fact, for a satellite with batteries located on both the east and west faces recharge may be sequenced such that it occurs first on the shaded west face after eclipse discharge and then on the shaded east face.

The above is well recognized by those skilled in the art, and, for example the Russian Yamal satellite employs east and west located batteries combined with sequence charging in which only the shaded battery is recharged. There are, however, problems with the Yamal type implementation of east west batteries which include:

(1) The quiescent battery temperature may be adversely increased by solar radiation which will increase its temperature of operation during eclipse thereby decreasing the degree to which it can be cooled during recharge. The net result of this is that the capacity of the battery will be reduced as it may not reached the optimum recharge temperatures taught in U.S. Pat. No. 5,395,706.

(2) As the batteries are sequence charged with less than 12 hours cooling per battery the radiator area per unit of battery capacity must be larger to cool the individual batteries in the shorter time period vs. north south batteries.

(3) As the radiators are larger the power required to maintain the battery above minimum temperature is larger which adversely impacts the allocation of solar array power (typically valued at $1000 per watt for space applications) to battery heaters.

(4) Sequentially recharging batteries leads, on a two bus satellite, to a unbalanced condition between the stored energy in the two busses when the batteries recharge. This imbalance, in turn, may require shutting down the payload in an emergency loss of lock condition.

(5) If the batteries are also used as the power source for electric thrusters (used, for example, for north south stationkeeping) logistical problems may be encountered if the battery used for energy during thrust is exposed to the sun at a specified firing time.

It was with knowledge of the foregoing that the present invention has been conceived and is now reduced to practice.

SUMMARY OF THE INVENTION

The present invention relates to a battery system for an body stabilized satellite traveling in a geosynchronous orbit comprising east and west battery modules and similarly facing radiators for discharging heat to deep space. Heat conduction arteries connect each battery module to its associated radiator. An east thermal switch is operable for thermally connecting the east battery module to and from the east facing radiator. Similarly, a west thermal switch is operable for thermally connecting the west battery module to and from the west facing radiator. The switches are selectively operated such that, in one instance, for a time between the satellite's emergence from the earth's shadow near local midnight and its position near local noon, the respective thermal switches thermally connect the west battery module to its radiator while thermally disconnecting the east battery module from its radiator. In another instance, beginning when the satellite is near local noon and ending as it enters the earth's shadow, the west thermal switch thermally disconnects the west battery module from its radiator while the east thermal switch thermally connects the east battery module to its radiator. In still another instance, beginning when the satellite is in the shadow of the earth, the battery modules are simultaneously thermally connected to their associated radiators. Charging of each battery proceeds while it is thermally connected to its respective radiator.

In another manner of explanation, the invention relates to the technique of relocating the battery radiators to the generally unused east and west surfaces of a body stabilized satellite. Thermal radiators in body stabilized satellites are normally placed on the north and south satellite faces as these faces typically have a maximum solar incidence angle of only 23.5° Relocation of the battery to the east and west faces is possible as batteries do not operate continuously when the satellite is exposed to the sun. Relocation is enabled with novel use of variable conduction heat pipes (optimally other thermal switching methods may be employed such as diode heat pipes and gas filled bladders) and sequenced charging of the batteries with controlled overcharge. The invention enables substantial increases in satellite payload power by providing additional radiator area on the north and south surfaces for equipment which must operate continuously and provides additional mounting area for this equipment.

A primary feature of the invention, then, is to provide for the relocation of the battery radiators of a geosynchronous satellite to the generally unused east and west surfaces of a body stabilized satellite.

Another feature of the invention is to provide such a technique according to which the satellite has a pair of batteries, each with an associated radiator, one radiator being east facing for discharging heat from an east battery to deep space, another radiator being west facing for discharging heat from a west battery to deep space.

Still another feature of the invention is to provide such a technique according to which one smaller, auxiliary, radiator is provided on the north face of the satellite and thermally connected to the east or west battery module and another smaller, auxiliary, radiator is provided on the south face of the satellite and thermally connected to the west or east battery module.

A further feature of the invention is to provide such a technique according to which, in a first instance, the east battery module is thermally connected to the east facing radiator while the west battery module is thermally disconnected from the west facing radiator; in a second instance, the west battery module is thermally connected to the west facing radiator while the east battery module is thermally disconnected from the east facing radiator; and in a third instance, simultaneously, the east battery module is thermally connected to the east facing radiator and the west battery module is thermally connected to the west facing radiator. Furthermore, the two batteries may be thermally connected to each other, with, for example, heat pipes. The two batteries may then simultaneously reject heat from either the east, west or east and west radiators.

Still another feature of the invention is to provide such a manner of operation in which the first instance is performed during a finite period of the geosynchronous orbit of the satellite beginning as the satellite emerges from the shadow of the earth and ending when the satellite is closest to the sun at local noon, in which the second instance is performed during a finite period of the geosynchronous orbit of the satellite beginning when the satellite is closest to the sun and ending as the satellite enters the shadow of the earth; and in which the third instance is performed during a finite period of the geosynchronous orbit of the satellite beginning when the satellite is in the shadow of the earth.

Yet a further feature of the invention is to provide such a technique according to which charging of each battery proceeds while it is thermally connected to its respective radiator.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
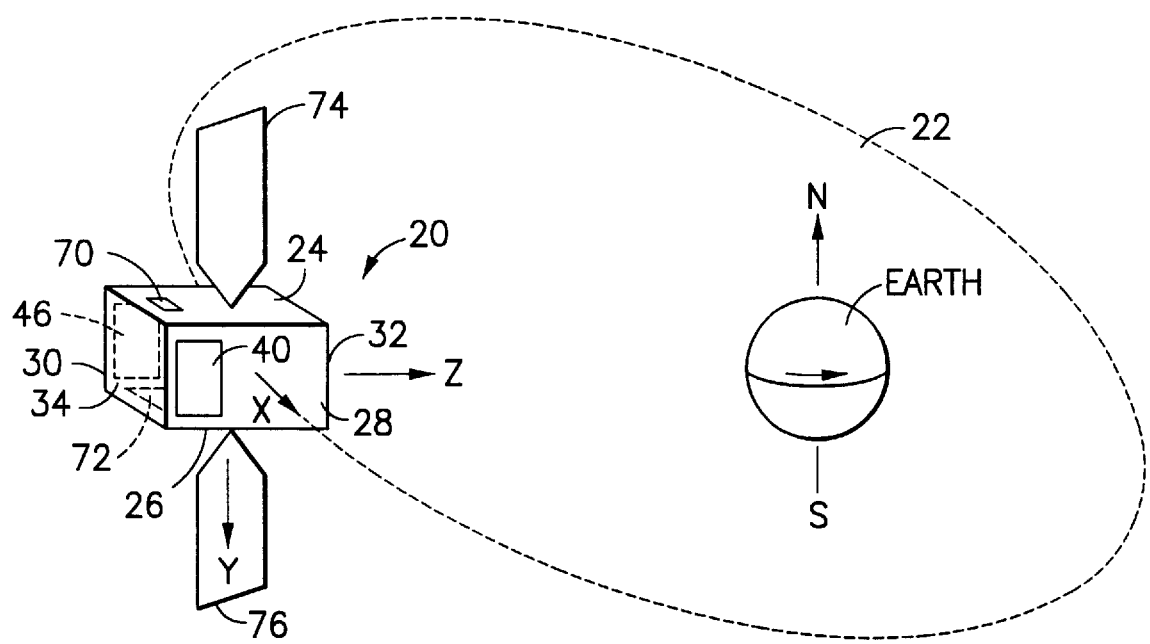
FIG. 1 is a diagrammatic representation, in perspective, of an body stabilized satellite traveling in a geosynchronous orbit about the earth and embodying the battery system of the invention.
Figure 2:
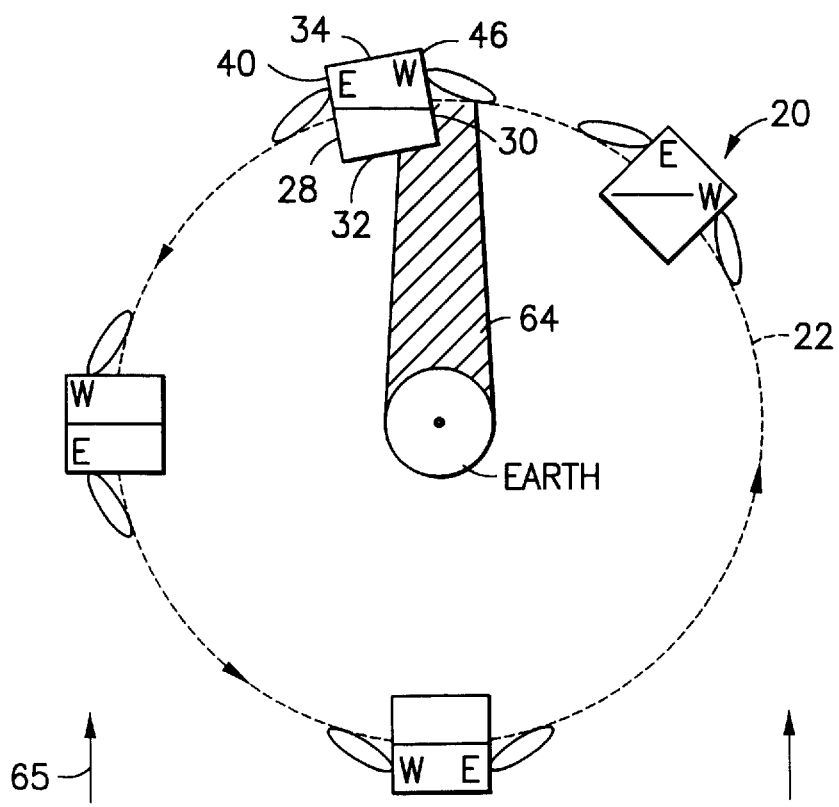
FIG. 2 is a plan view of all components illustrated in FIG. 1.

Turn now to the drawings and, initially, to FIGS. 1 and 2 which illustrate an body stabilized satellite 20 exhibiting x, y, and z axes and traveling in a geosynchronous orbit 22 about the earth E and having north and south faces 24, 26, respectively, east and west faces 28, 30, respectively, and earth and anti earth faces 32, 34, respectively.

A modular spacecraft battery system 36 (FIG. 3) for the satellite 20 comprises an east battery module 38 suitably mounted on the satellite 20, an east facing radiator 40 for discharging heat to deep space from the east battery module, and an east heat conduction artery 42 of suitable construction connecting the east battery module and the east facing radiator. In similar fashion, a west battery module 44 is mounted on the satellite 20 and is associated with a west facing radiator 46 for discharging heat to deep space from the west battery module. A west heat conduction artery 48 connects the west battery module and the west facing radiator. The heat conduction arteries serve to transmit heat from each battery module to its associated radiator. Of course, for optimum efficiency, it is desirable for the heat conduction arteries to be of minimal length.

Figure 3:
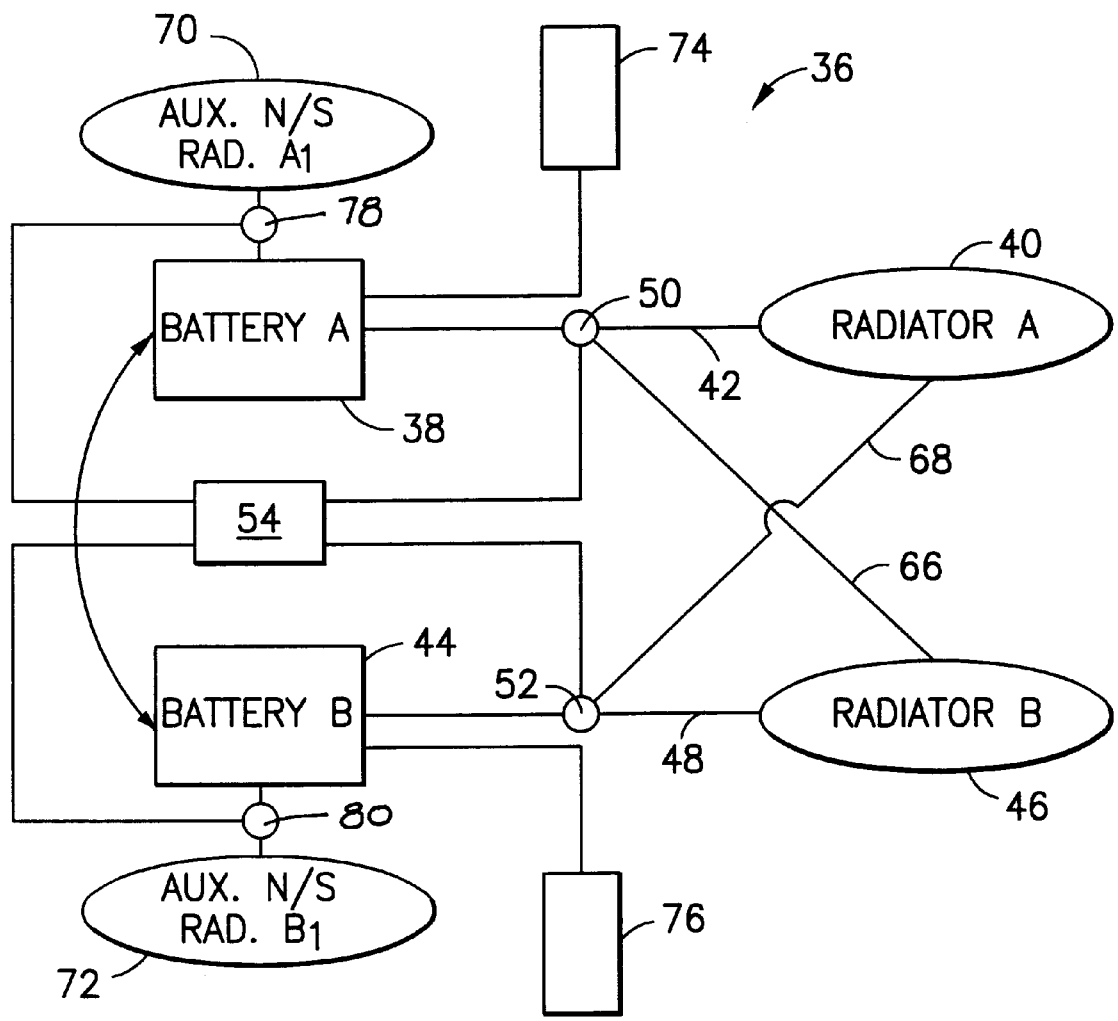
FIG. 3 is a schematic representation of the battery system of the invention.

As schematically represented in FIG. 3, an east thermal switch device 50 is operable for thermally connecting the east battery module 38 to the east facing radiator 40 and, conversely, for thermally disconnecting the east battery module from the east facing radiator. In a similar manner, also as schematically represented in FIG. 3, a west thermal switch device 52 is operable for thermally connecting the west battery module 44 to the west facing radiator 46 and, conversely, for thermally disconnecting the west battery module from the west facing radiator.

A suitable controller 54 is provided for selectively operating the east and west thermal switch devices 50, 52 such that, in one instance, the east thermal switch device 50 thermally connects the east battery module 38 to the east facing radiator 40 while the west thermal switch device 52 thermally disconnects the west battery module 44 from the west facing radiator 46. In another instance, the east thermal switch device thermally disconnects the east battery module from the east facing radiator while the west thermal switch device thermally connects the west battery module to the west facing radiator. In still another instance, the switch devices 50, 52 simultaneously thermally connect the east battery module to the east facing radiator and thermally connect the west battery module to the west facing radiator.

The present invention addresses the above problems by first employing suitable apparatus to thermally disconnect a battery module from its east or west facing radiator when the radiator is subject to high incident solar illumination. One way of accomplishing this is through the use of a variable conduction heat pipe 50, 52 (FIG. 4) which can commandably be turned on or off. Such heat pipes (described for example in the Handbook of Applied Thermal Design, E. C. Guyer, Editor in Chief, McGraw-Hill Book Company, New York, etc., 1989, pages 7–50 through 7–58) are built with a non-condensable gas reservoir 56.

Figure 4:
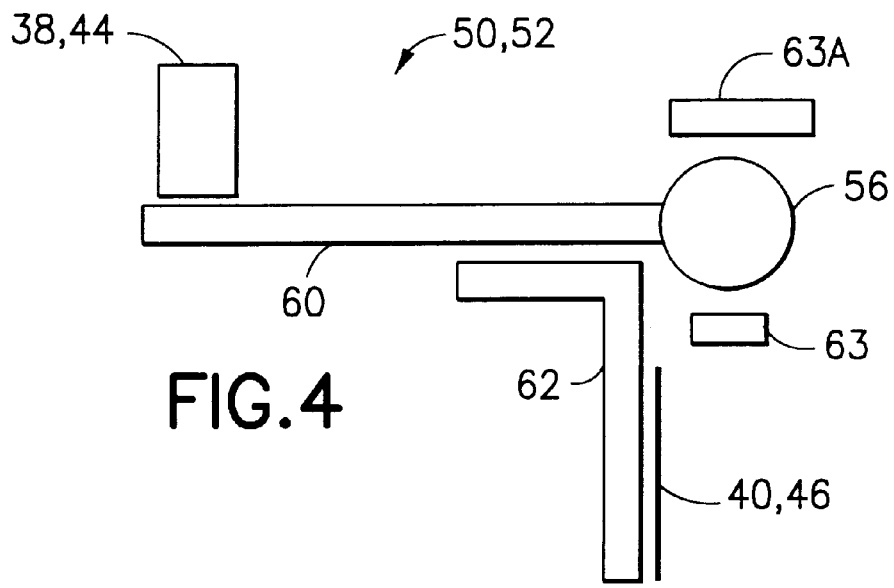
FIG. 4 is a diagrammatic representation of one form of a thermal switch device for use with the battery system of the invention.

For example, viewing FIG. 4, heating a non-condensable gas such as nitrogen in a reservoir 56 of a thermal switch device 50, 52 causes it to expand and force the condensable gas back into a heat pipe 60 in fluid communication therewith thereby restricting the length over which the heat pipe 60 acts to conduct heat. If the heat pipe 60 is joined to a second heat pipe 62 and radiator 40, 46 beyond the above non-condensable/condensable gas juncture, then alternatively heating and cooling the noncondensable gas will act to disconnect or connect a heat source such as the battery modules 38, 44 to a radiator. Also associated with the thermal switch devices 50, 52 and, more specifically, with the reservoir 56 are a heater 63 for heating the non-condensable gas and a radiator 63A for drawing heat away from the reservoir.

The present invention, then, may use a variable conduction heat pipe to create a thermal switch between an east or west battery module and its associated radiator. Note that the same effect could be achieved with other forms of thermal switching, for example, a diode heat pipe or a thermal joint based on a fusible alloy or the inflation of a helium bladder. The critical feature is the commandability of the thermal connection between the heat source and the heat rejection system. Based on the schematic diagram illustrated in FIG. 4, it can be seen that many of the previously enumerated problems with east west batteries are solved, for example:

by opening the thermal switch the heating of the battery is prevented when its radiator is exposed to the sun;

by opening the thermal switch when the battery is near its minimum desired temperature the need for a battery heater is reduced or eliminated as the battery will not be further excessively cooled; and if the batteries must be discharged with sun on the radiator (e g, electric thruster operation) this may be carried out adiabatically (that is, without gain or loss of heat) with the thermal switch open and the thermal mass of the battery used to control its temperature. Subsequent battery cooling and recharge may be carried out once the battery radiator is sufficiently pointed away from the sun.

These features of the invention for a geosynchronous satellite are schematically illustrated in FIG. 2. As the satellite 20 exits eclipse 64, the east sun lit battery module 38 is isolated from its radiator 40 while the west shaded battery module 44 is being recharged. West battery module recharge proceeds until such time as the satellite reaches the high noon point of its orbit. At this point, the fully charged west battery module is returned to open circuit and disconnected from its radiator while the east battery is connected to its radiator and its recharging begins. With both batteries fully charged, the west radiator is reconnected prior to the satellite again entering eclipse 64.

Figure 5:
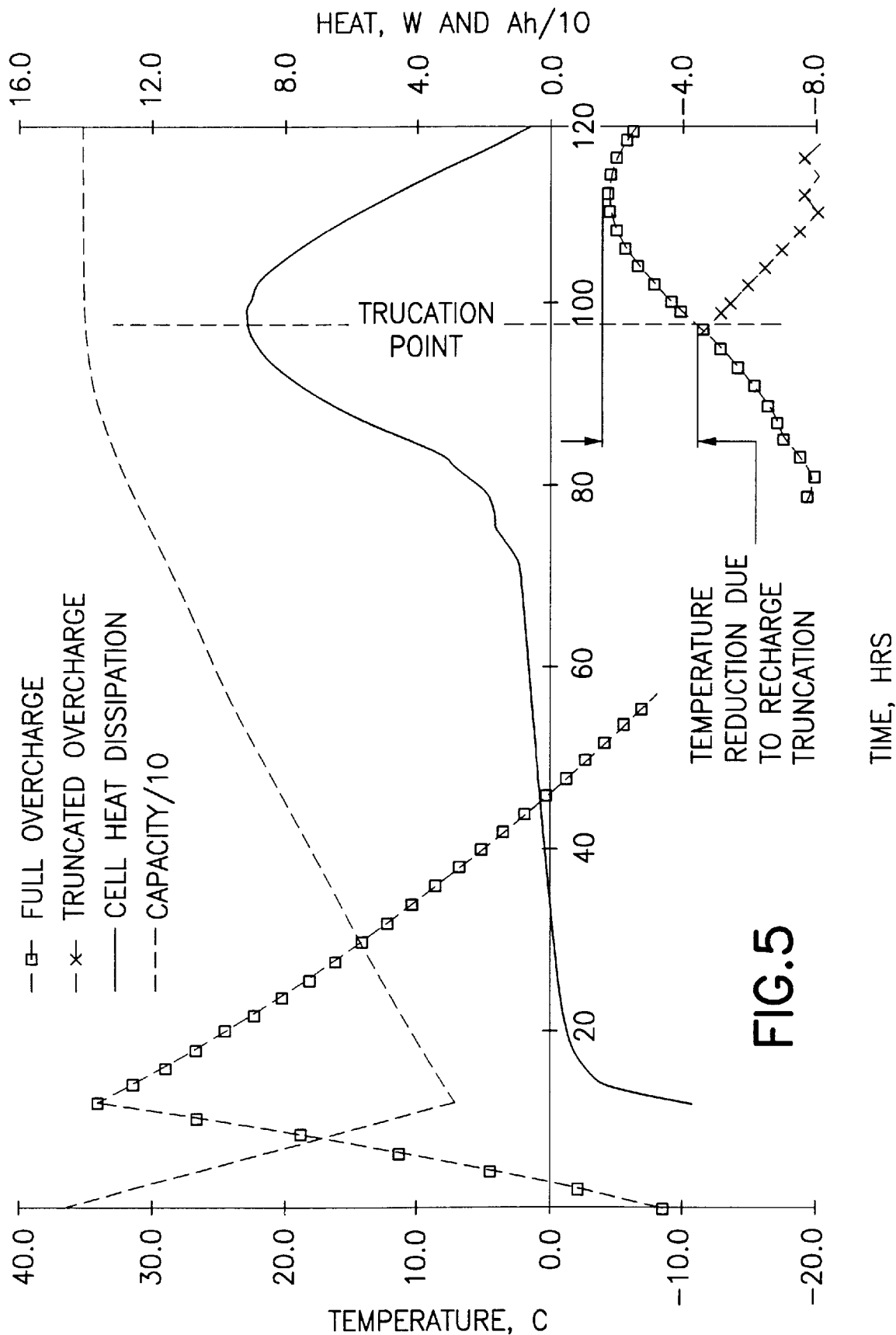
FIG. 5 is a graph displaying, over time, comparative recharge profiles for batteries operated with a typical full taper charge versus a recharge profile in which charging is terminated at the peak of the heat generation curve.

The problem of capacity optimization while simultaneously limiting the required radiator area required by the battery or battery modules has been addressed by optimization of the recharge profile. In FIG. 5, comparative recharge profiles are given for batteries operated with a typical full taper charge (such as taught in commonly assigned U.S. Pat. Nos. 5,395,706 and 5,652,073) versus a recharge profile in which charging is terminated at the peak of the heat generation curve. Note that when recharge is terminated at the peak of the heat generation curve, less than 1% of the battery capacity is lost. The effect of this, however, is to reduce the recharge temperature rise by 10° C. Of course, this reduction in temperature could also be achieved with a larger radiator. This solution, however, entails its own mass impact and may affect satellite payload capability.

The reduced temperature at the end of charge is critical not only for limiting the maximum temperature reached during the subsequent recharge but for also limiting temperature increases during periods when the battery is disconnected from its radiator. Recall that the battery may be disconnected from its radiator to eliminate solar heating. However, even with this heat source removed, it is anticipated that the battery temperature will rise due to satellite heat leakage into the battery modules and due to battery self discharge, for example:

$$NiOOH + \tfrac{1}{2}H_2 \rightarrow NiO_2H_2. \tag{1}$$

Figure 6:
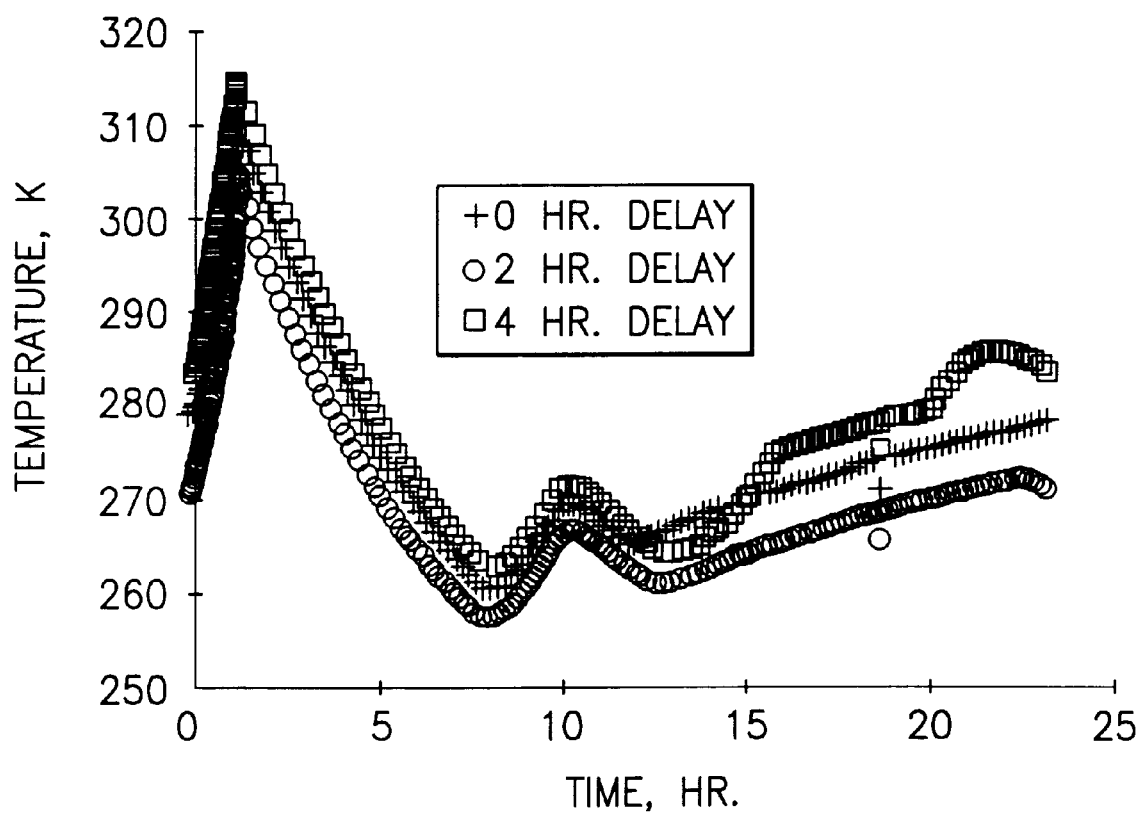
FIG. 6 is a graph displaying the effect on battery temperature of timing of the operation of the thermal switch devices thermally connecting the battery modules to their respective radiators.

Temperature rise with the radiator disconnected is further controlled by timing the operation of the thermal switch. The incident angle of the sun on the battery radiator changes from 0° to 90° over a six hour period. The actual heat input into the battery is a function of the sine of the angle of incident solar radiation indicated by arrows 65 in FIG. 2. During early periods of illumination and just prior to shadowing, the net heat flow is to the radiator. Efficient implementation is therefore achieved by proper timing of the operation of the thermal switch devices 50, 52. This may be further optimized by ending discharge one to two hours before radiator rotation to the sun as self discharge exponentially decays after the termination of charge. The effect of this optimization is illustrated in FIG. 6.

In still another embodiment of the invention, as seen in FIG. 3, crossing heat conduction arteries 66, 68 may connect the two battery modules 38, 44. In this embodiment, a battery module may be disconnected from its own radiator but connected to the radiator of the opposite battery module. This approach may allow dissipation of self discharge and leak heat during periods of direct radiator isolation.

Alternatively, viewing FIGS. 1 and 3, each battery module 38, 44 may have small auxiliary north and south radiators 70, 72 associated respectively with the battery modules 38, 44 which operate continuously. An auxiliary thermal switch 78 is selectively operable for thermally connecting the auxiliary north facing radiator 70 to the first battery module and an auxiliary thermal switch 80 is selectively operable for thermally connecting the auxiliary south facing radiator 72 to the second battery module. The auxiliary north and south radiators 70, 72 are typically located in the planes of the north and south faces 24, 26, respectively. In another instance, it is within the scope of the invention to connect modules to auxiliary radiators on the anti-earth face using variable conductor heat pipes or diode heat pipes.

An additional aspect of this invention deals with capacity imbalance. The imbalance issue may be partially addressed by simultaneously recharging both battery modules at eclipse for a short period (for example, 1–2 hours) prior to full sun illumination on the east battery module. This allows accumulation of some charge in the east battery module and limited full power operation m the event of a loss of solar lock. Loss of solar lock occurs when north and south arrays 74, 76, respectively (FIGS. 1 and 3) are not facing the sun or for various reasons become unbalanced in the power they generate individually. The arrays 74, 76 serve both to recharge the battery modules 38, 44 and power the satellite during the non-eclipse portion of the orbit 22.

Still another aspect of the invention is using charging power supplies from both the east and west power conversion units to recharge both battery modules. This limits the concentration of heat at a single charging system thereby promoting efficient satellite thermal design.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A battery system for a body stabilized satellite traveling in an orbit and having generally north, south, east, west, earth, and anti earth faces comprising:
    a first battery module mounted on the satellite;
    an east facing radiator for discharging heat to deep space from said first battery module;
    an east heat conduction artery connecting said first battery module and said east facing radiator;
    a second battery module mounted on the satellite;
    a west facing radiator for discharging heat to deep space from said second battery module;
    a west heat conduction artery connecting said second battery module and said west facing radiator;
    east thermal switch means operable for thermally connecting said first battery module to said east facing radiator and for thermally disconnecting said first battery module from said east facing radiator;
    west thermal switch means operable for thermally connecting said second battery module to said west facing radiator and for thermally disconnecting said second battery module from said west facing radiator; and
    a controller for selectively operating said east and west thermal switch means;
    whereby, in one instance, said east thermal switch means thermally connects said first battery module to said east facing radiator while said west thermal switch means thermally disconnects said second battery module from said west facing radiator and, in another instance, said east thermal switch means thermally disconnects said first battery module from said east facing radiator while said west thermal switch means thermally connects said second battery module to said west facing radiator and, in still another instance, simultaneously thermally connects said first battery module to said east facing radiator and thermally connects said second battery module to said west facing radiator.

2. A battery system as set forth in claim 1
    an auxiliary north facing radiator for charging heat to deep space from said first battery module;
    an auxiliary heat conduction artery connecting said first battery module battery and said auxiliary north facing radiator;
    auxiliary south facing radiator for discharging heat to deep space from said second battery module;
    an auxiliary heat conduction artery connecting said second battery module and said south facing radiator; and
    auxiliary thermal switch means selectively operable for thermally connecting said auxiliary north facing radiator to said first battery module and for thermally connecting said auxiliary south facing radiator to said second battery module.

3. A battery system as set forth in claim 1 including:
    means for electrically charging each of said battery modules.

4. A battery system as set forth in claim 3 wherein said battery charging means includes:
    a north face mounted solar array electrically connected to said first battery module; and
    a south face mounted solar array electrically connected to said second battery module.

5. A battery system as set forth in claim 3 including:
    wherein said battery charging means includes:
        a north face mounted solar array electrically selectively connected to either said first battery module or said second battery module, or to both said first battery module and said second battery module; and
        a south face mounted solar array electrically connected to either said first battery module or said second battery module, or to both said first battery module and said second battery module; and
        switch means operable for selectively connecting, electrically, said north face mounted solar array and said south face mounted solar array to said first and second battery modules, respectively; and
        controller means for operating said switch means.

6. A battery system as set forth in claim 1 including:
    a first crossing heat conduction artery connecting said east heat conductive artery and said west facing radiator, said east thermal switch means being selectively operable for thermally connecting said east battery module to said west facing radiator and for thermally disconnecting said east battery module from said west facing radiator; and
    a second crossing heat conduction artery connecting said west heat conductive artery and said east facing radiator, said west thermal switch means being selectively operable for thermally connecting said west battery module to said east facing radiator and for thermally disconnecting said west battery module from said east facing radiator.

7. A method of arranging and operating a battery system for a body stabilized satellite traveling in a geosynchronous orbit and having north, south, east, west, earth, and anti earth faces comprising the steps of:
    (a) mounting a first battery module internally to the satellite;
    (b) mounting a second battery module internally to the satellite;
    (c) mounting an east facing radiator on the east face of the satellite for discharging heat to deep space from the first battery module;
    (d) mounting a west facing radiator on the west face of the satellite for discharging heat to deep space from the second battery module;

(e) in one instance thermally connecting the first battery module to the east facing radiator while thermally disconnecting the second battery module from the west facing radiator;

(f) in another instance thermally connecting the second battery module to said west facing radiator while thermally disconnecting the first battery module from the east facing radiator; and (g) in still another instance, simultaneously thermally connecting the first battery module to the east facing radiator and thermally connecting the second battery module to the west facing radiator.

8. A method of arranging and operating a battery system as set forth in claim 7 wherein the first battery module is mounted proximate the east facing radiator; and wherein the second battery module is mounted proximate the west facing radiator.

9. A method of arranging and operating a battery system as set forth in claim 7 including the steps of:

(h) performing step (e) during a finite period of the geosynchronous orbit of the satellite beginning as the satellite emerges from the shadow of the earth and ending when the satellite is nearest the sun;

(i) performing step (f) during a finite period of the geosynchronous orbit of the satellite beginning when the satellite is nearest the sun and ending as the satellite enters the shadow of the earth; and (j) performing step (g) during a finite period of the geosynchronous orbit of the satellite beginning when the satellite is in the shadow of the earth.

10. A method of arranging and operating a battery system as set forth in claim 7 including the step of:

(h) electrically charging each battery module while it is thermally connected to its respective one of the radiators.

11. A method of arranging and operating a battery system as set forth in claim 9 including the steps of:

(k) charging the first battery module concurrently with step (h);

(l) charging the second battery module concurrently with step (i); and (m) charging both the first battery and the second battery concurrently with step (j).

12. A method of arranging and operating a battery system as set forth in claim 7 including the step of:

(h) ending discharge of each of said battery modules a predetermined time before rotation to the sun of an associated one of the radiators.

* * * * *